United States Patent
Kim et al.

(10) Patent No.: US 11,251,463 B2
(45) Date of Patent: *Feb. 15, 2022

(54) METHOD FOR PREPARING A SINTERED SOLID ELECTROLYTE HAVING HIGH IONIC CONDUCTIVITY FOR AN ALL-SOLID-STATE BATTERY

(71) Applicant: KOREA INSTITUTE OF INDUSTRIAL TECHNOLOGY, Cheonan-si (KR)

(72) Inventors: Ho Sung Kim, Gwangju (KR); Min Young Kim, Gwangju (KR); Seung Hoon Yang, Gwangju (KR); Da Hye Kim, Gwangju (KR); Hye Min Ryu, Gwangju (KR); Ha Young Jung, Gwangju (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 147 days.

This patent is subject to a terminal disclaimer.

(21) Appl. No.: 16/348,675

(22) PCT Filed: Oct. 27, 2017

(86) PCT No.: PCT/KR2017/012016
§ 371 (c)(1),
(2) Date: May 9, 2019

(87) PCT Pub. No.: WO2018/093059
PCT Pub. Date: May 24, 2018

(65) Prior Publication Data
US 2019/0273283 A1 Sep. 5, 2019

(30) Foreign Application Priority Data
Nov. 18, 2016 (KR) .......... 10-2016-0154092

(51) Int. Cl.
*H01M 10/0562* (2010.01)
*H01M 10/058* (2010.01)
(Continued)

(52) U.S. Cl.
CPC ...... *H01M 10/0562* (2013.01); *C01G 25/006* (2013.01); *C01G 25/02* (2013.01);
(Continued)

(58) Field of Classification Search
CPC .......... H01M 10/0562; H01M 10/052; H01M 10/058; H01M 10/0585; H01M 10/0525;
(Continued)

(56) References Cited

U.S. PATENT DOCUMENTS

2016/0380304 A1* 12/2016 Kim .................. C04B 35/50
429/189

FOREIGN PATENT DOCUMENTS

JP 2008-501216 A 1/2008
JP 4779988 B2 9/2011
(Continued)

OTHER PUBLICATIONS

Dong et al. J. Am. Ceram. Soc., 94 [4] 1114-1118 (2011) (Year: 2011).*
(Continued)

*Primary Examiner* — Alexander Usyatinsky
(74) *Attorney, Agent, or Firm* — Rabin & Berdo, P.C.

(57) ABSTRACT

A method of preparing a sintered solid electrolyte includes (a) coprecipitating a mixed solution including a lanthanum precursor, a zirconium precursor, a gallium precursor, a complexing agent, and a pH adjuster to provide a solid electrolyte precursor; (b) washing and drying the solid electrolyte precursor to provide a washed and dried solid electrolyte precursor; (c) mixing the washed and dried solid electrolyte precursor with a lithium source to provide a
(Continued)

mixture; (d) calcining the mixture to provide a calcined solid electrolyte, which is a gallium (Ga)-doped lithium lanthanum zirconium oxide (LLZO), as represented by Chemical Formula 1 below, $Li_xLa_yZr_zGa_wO_{12}$, Chemical Formula 1 where 5≤x≤9, 2≤y≤4, 1≤z≤3, and 0<w≤4; and (e) sintering the calcined solid electrolyte at a temperature ranging from 1,000° C. to 1,300° C. to provide the sintered solid electrolyte, wherein a ratio (M1:M2) of moles (M1) of lithium element to moles (M2) of gallium element ranges from 6.7:0.1 to 5.8:0.4.

13 Claims, 3 Drawing Sheets

(51) Int. Cl.
    *C01G 25/02* (2006.01)
    *H01M 10/052* (2010.01)
    *H01M 10/0525* (2010.01)
    *C01G 25/00* (2006.01)
    *H01M 10/0585* (2010.01)

(52) U.S. Cl.
    CPC ....... *H01M 10/052* (2013.01); *H01M 10/058* (2013.01); *H01M 10/0525* (2013.01); *H01M 10/0585* (2013.01); *C01P 2002/52* (2013.01); *C01P 2002/72* (2013.01); *C01P 2004/03* (2013.01); *H01M 2300/0071* (2013.01); *Y02E 60/10* (2013.01); *Y02T 10/70* (2013.01)

(58) Field of Classification Search
    CPC ........... H01M 2300/0071; C01G 25/02; C01G 25/006; Y02P 70/50; C01P 2002/52; C01P 2002/72; C01P 2004/03; Y02T 10/70; Y02E 60/10
    See application file for complete search history.

(56) References Cited

FOREIGN PATENT DOCUMENTS

| | | |
|---|---|---|
| JP | 2012-224520 A | 11/2012 |
| JP | 2017168396 A | 9/2017 |
| KR | 10-2015-0005136 * | 1/2015 |
| KR | 10-2015-0005136 A | 1/2015 |
| WO | WO 2005-117191 A1 | 12/2005 |

OTHER PUBLICATIONS

Afyon et al., "A Shortcut to Garnet-type Fast Li-ion Conductors for All-solid State Batteries", Journal of Materials Chemistry A, 2015, p. 18636-18648 (Year: 2015).*
20160154092,Written_Decision_on_Registration_(TRANSLATED),Jul. 16, 2018 (Year: 2018).*
2019526308,Decision_to_Grant_a_Patent_(TRANSLATED),Jan. 12, 2021 (Year: 2021).*
Afyon, Semih et al., "A Shortcut to Garnet-type Fast Li-ion Conductors for All-solid State Batteries", Journal of Materials Chemistry A, 2015, p. 18636-18648, vol. 3, No. 36.
Jalem, Randy et al., "Effects of Gallium Doping in Garnet-type Li7La3Zr2O12 Solid Electrolytes", Chemistry of Materials, 2015, pp. 2821-2831, vol. 27, No. 8.
Wagner, Reinhard et al., "Crystal Structure of Garnet-related Li-ion Conductor Li7—3xGaxLa3Zr2O12: Fast Li-ion Conduction Caused by a Different Cubic Modification", Chemistry of Materials, Feb. 2016, pp. 1861-1871, vol. 28, No. 6.

* cited by examiner

METHOD FOR PREPARING A SINTERED SOLID ELECTROLYTE HAVING HIGH IONIC CONDUCTIVITY FOR AN ALL-SOLID-STATE BATTERY

TECHNICAL FIELD

The present invention relates to a solid electrolyte having high ionic conductivity for an all-solid-state battery, and more particularly to a gallium-doped solid electrolyte having high ionic conductivity, in which the amount of a gallium element in a starting material is adjusted to thus control sintering properties and the crystal structure thereof is also controlled, thereby increasing the ionic conductivity of the solid electrolyte, and to a method of preparing the same.

BACKGROUND ART

Lithium secondary batteries have large electrochemical capacity, high operating potential and excellent charge/discharge cycle characteristics, and thus there is increasing demand therefor for applications such as portable information terminals, portable electronic devices, small-sized power storage devices for home use, motorcycles, electric vehicles, hybrid electric vehicles, etc. Due to the spread of such applications, improved safety and increasingly high performance of lithium secondary batteries are required.

Conventional lithium secondary batteries use a liquid electrolyte and are readily ignited when exposed to water in the air, thus posing a stability problem. This stability issue is becoming more important as electric vehicles become more commercially viable.

Hence, thorough research is ongoing these days into an all-solid-state secondary battery using a solid electrolyte formed of a non-combustible inorganic material for the purpose of safety improvement. An all-solid-state secondary battery is receiving attention as a next-generation secondary battery with the goals of improved stability, high energy density, high power output, long life, simplification of manufacturing processes, formation of large/compact batteries, and reduced costs.

An all-solid-state lithium secondary battery is configured to include a cathode, a solid electrolyte layer, and an anode, in which the solid electrolyte of the solid electrolyte layer is required to have high ionic conductivity and low electronic conductivity.

The solid electrolyte, which satisfies the requirements of the solid electrolyte layer of the all-solid-state secondary battery, includes a sulfide-based solid electrolyte, an oxide-based solid electrolyte, etc. Among these, a sulfide-based solid electrolyte is problematic in that a resistance component is generated due to the interfacial reaction with the cathode active material or the anode active material, hygroscopicity is strong, and hydrogen sulfide ($H_2S$) gas, which is toxic, is generated.

Japanese Patent No. 4,779,988 discloses an all-solid-state lithium secondary battery having a stacked structure comprising a cathode, a solid electrolyte layer, and an anode and composed of a sulfide-based solid electrolyte layer.

Widely known examples of an oxide-based solid electrolyte include LLTO ($Li_{3x}La_{2/(3-x)}TiO_3$), LLZO ($Li_7La_3Zr_2O_{12}$), and the like, among which LLZO, having relatively high grain boundary resistance but superior potential window characteristics compared to LLTO, is receiving attention as a promising material.

Although LLZO has advantages such as high ionic conductivity, low reactivity with an electrode material, a wide potential window (0 to 6 V), and the like, it is difficult to control processing conditions due to volatilization of lithium (Li) during a sintering process, and the preparation thereof is complicated and difficult owing to the low sinterability thereof, making it hard to realize real-world application of LLZO. Moreover, since the ionic conductivity thereof varies greatly depending on the crystal structure, it is necessary to develop techniques for controlling the crystal structure of LLZO by adjusting the starting material composition, sintering properties, and the like.

DISCLOSURE

Technical Problem

Accordingly, the present invention is intended to provide a method of preparing a solid electrolyte, in which the ratio of a gallium element in a starting material and a lithium element from a lithium source is adjusted to thus control the crystal structure of the solid electrolyte, thereby increasing the ionic conductivity of the solid electrolyte.

In addition, the present invention is intended to provide a solid electrolyte having high ionic conductivity.

Technical Solution

An aspect of the present invention provides a solid electrolyte configured such that a lithium lanthanum zirconium oxide (LLZO) is doped with a gallium element (Ga), as represented by Chemical Formula 1 below.

[Chemical Formula 1]

Also, the solid electrolyte may be represented by Chemical Formula 2 below.

[Chemical Formula 2]

Also, the solid electrolyte may include at least one structure selected from among a cubic structure and a tetragonal structure.

Also, the solid electrolyte may include a cubic structure.

Another aspect of the present invention provides an all-solid-state lithium secondary battery, comprising an anode, a solid electrolyte layer including the solid electrolyte, and a cathode on the solid electrolyte layer.

Still another aspect of the present invention provides a method of preparing a solid electrolyte, the method comprising: (a) preparing a solid electrolyte precursor by subjecting a mixed solution comprising a lanthanum precursor, a zirconium precursor, a gallium precursor, a complexing agent, and a pH adjuster to coprecipitation; (b) washing and drying the solid electrolyte precursor; (c) preparing a mixture by mixing the washed and dried solid electrolyte precursor with a lithium source; and (d) calcining the mixture to give a calcined solid electrolyte, which is a gallium (Ga)-doped lithium lanthanum zirconium oxide (LLZO), as represented by Chemical Formula 1 below.

[Chemical Formula 1]

Also, the solid electrolyte may be represented by Chemical Formula 2 below.

[Chemical Formula 2]

Also, the ratio (M1:M2) of moles (M1) of the lithium element of the lithium source in step (c) to moles (M2) of the gallium element of the gallium precursor in step (a) may be 6.7:0.1 to 5.8:0.4.

Also, the ratio (M1:M2) of moles (M1) of the lithium element of the lithium source in step (c) to moles (M2) of the gallium element of the gallium precursor in step (a) may be 6.55:0.15 to 5.95:0.35.

Also, the ratio (M1:M2) of moles (M1) of the lithium element of the lithium source in step (c) to moles (M2) of the gallium element of the gallium precursor in step (a) may be 6.4:0.2 to 6.1:0.3.

Also, the ratio (M1:M2) of moles (M1) of the lithium element of the lithium source in step (c) to moles (M2) of the gallium element of the gallium precursor in step (a) may be 6.25:0.25.

Also, the method of the present invention may further comprise (e) preparing a sintered solid electrolyte by sintering the solid electrolyte represented by Chemical Formula 1, after step (d).

Also, the lanthanum precursor may be lanthanum nitrate hydrate ($La(NO_3)_3 \cdot xH_2O$).

Also, the zirconium precursor may be zirconium nitrate hydrate ($ZrO(NO_3)_2 \cdot xH_2O$).

Also, the gallium precursor may be gallium nitrate hydrate ($Ga(NO_3)_3 \cdot xH_2O$).

Also, the complexing agent may be ammonium hydroxide ($NH_4OH$).

Also, the pH adjuster may be sodium hydroxide (NaOH).

Also, the lithium source may be lithium hydroxide hydrate ($LiOH \cdot H_2O$).

Also, the calcining may be performed at 700° C. to 1,000° C.

Also, the sintering may be performed at 1,000° C. to 1,300° C.

Advantageous Effects

In a method of preparing a solid electrolyte according to the present invention, the ratio of a gallium element in a starting material and a lithium element from a lithium source is adjusted to thus control a crystal structure, thereby increasing the ionic conductivity of the solid electrolyte.

Also, a solid electrolyte having increased ionic conductivity can be provided using the method of preparing the solid electrolyte noted above.

BEST MODE

Hereinafter, embodiments of the present invention are described in detail with reference to the appended drawings so as to be easily performed by a person having ordinary skill in the art to which the present invention belongs.

However, the following description does not limit the present invention to specific embodiments, and moreover, descriptions of known techniques, even if they are pertinent to the present invention, are considered unnecessary and may be omitted insofar as they would make the characteristics of the invention unclear.

The terms herein are used to explain specific embodiments and are not intended to limit the present invention. Unless otherwise stated, the singular expression includes a plural expression. In this application, the terms "include" or "have" are used to designate the presence of features, numbers, steps, operations, elements, or combinations thereof described in the specification, and should be understood as not excluding the presence or additional possibility of one or more different features, numbers, steps, operations, elements, or combinations thereof.

Below is a description of a solid electrolyte according to the present invention, which is merely set forth to illustrate but is not to be construed as limiting the present invention, and the present invention is only defined by the scope of the accompanying claims.

The present invention pertains to a solid electrolyte configured such that a lithium lanthanum zirconium oxide (LLZO) is doped with a gallium element (Ga), as represented by Chemical Formula 1 below.

$Li_xLa_yZr_zGa_wO_{12}$ ($5 \leq x \leq 9$, $2 \leq y \leq 4$, $1 \leq z \leq 3$, $0 < w \leq 4$) [Chemical Formula 1]

Also, the solid electrolyte may be represented by Chemical Formula 2 below.

$Li_{7-3x}Ga_xLa_3Zr_2O_{12}$ ($0.1 \leq x \leq 0.4$) [Chemical Formula 2]

Also, the solid electrolyte may include a cubic structure or a tetragonal structure, and preferably includes a single-phase cubic structure.

The present invention pertains to an all-solid-state lithium secondary battery, comprising an anode, a solid electrolyte layer including the solid electrolyte, and a cathode on the solid electrolyte layer.

Figure 1:
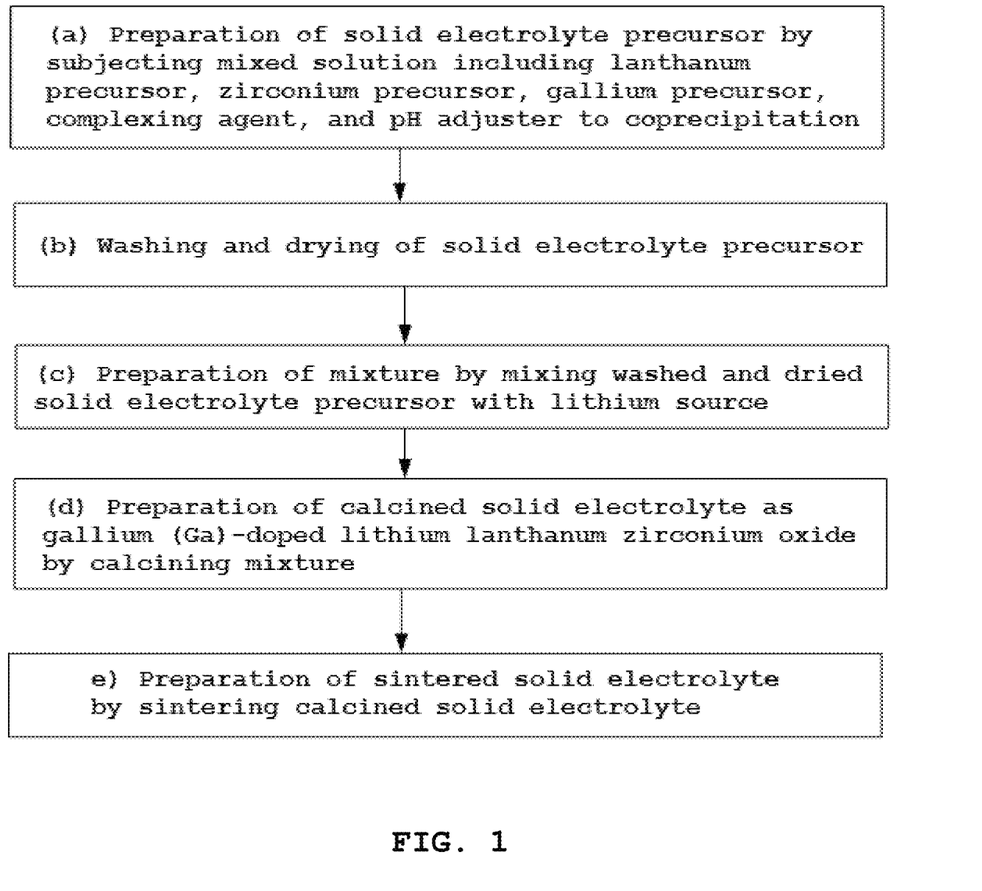
FIG. 1 is a flowchart showing a process of preparing a solid electrolyte according to the present invention.

FIG. 1 is a flowchart showing the process of preparing a solid electrolyte according to the present invention.

With reference to FIG. 1, the method of preparing the solid electrolyte according to the present invention is specified below.

The method of preparing the solid electrolyte according to the present invention may include (a) preparing a solid electrolyte precursor by subjecting a mixed solution comprising a lanthanum precursor, a zirconium precursor, a gallium precursor, a complexing agent, and a pH adjuster to coprecipitation, (b) washing and drying the solid electrolyte precursor, (c) preparing a mixture by mixing the washed and dried solid electrolyte precursor with a lithium source, and (d) calcining the mixture to give a calcined solid electrolyte, which is a gallium (Ga)-doped lithium lanthanum zirconium oxide (LLZO), as represented by Chemical Formula 1 below.

$Li_xLa_yZr_zGa_wO_{12}$ ($5 \leq x \leq 9$, $2 \leq y \leq 4$, $1 \leq z \leq 3$, $0 < w \leq 4$) [Chemical Formula 1]

Also, the solid electrolyte may be represented by Chemical Formula 2 below.

$Li_{7-3x}Ga_xLa_3Zr_2O_{12}$ ($0.1 \leq x \leq 0.4$) [Chemical Formula 2]

Specifically, a solid electrolyte precursor is prepared by subjecting a mixed solution comprising a lanthanum precursor, a zirconium precursor, a gallium precursor, a complexing agent, and a pH adjuster to coprecipitation (step a).

The ratio (M1:M2) of moles (M1) of the lithium element of the lithium source in step (c) to moles (M2) of the gallium element of the gallium precursor in step (a) is 6.7:0.1 to 5.8:0.4, preferably 6.55:0.15 to 5.95:0.35, more preferably 6.4:0.2 to 6.1:0.3, and much more preferably 6.25:0.25.

Here, when the ratio (M1:M2) of moles (M1) of the lithium element of the lithium source in step (c) to moles (M2) of the gallium element of the gallium precursor in step (a) is adjusted in this way, the crystal structure of the solid electrolyte may be controlled and the sinterability thereof may be improved. If the molar ratio (M1:M2) is less than 6.7:0.1, the amount of doped Ga, which is necessary to form a cubic structure, is insufficient, thus making it difficult to control sinterability, undesirably lowering ionic conductivity. On the other hand, if the molar ratio exceeds 5.8:0.4, Ga is excessively added, and thus the sintering density of pellets may decrease, undesirably lowering ionic conductivity.

Also, the lanthanum precursor may be lanthanum nitrate hydrate (La(NO$_3$)$_3$.xH$_2$O).

Also, the zirconium precursor may be zirconium nitrate hydrate (ZrO(NO$_3$)$_2$.xH$_2$O).

Also, the gallium precursor may be gallium nitrate hydrate (Ga(NO$_3$)$_3$.xH$_2$O).

The complexing agent may include ammonia water, sodium hydroxide, etc.

The pH adjuster functions to adjust the pH of the mixed solution in the range of 10 to 12, preferably 10.5 to 11.5, and more preferably 10.8 to 11.2.

Examples of the pH adjuster may include, but are not limited to, sodium hydroxide, ammonia, etc. Any pH adjuster may be used, so long as it is able to adjust the pH of the mixed solution without affecting the preparation of a solid oxide.

Next, the solid electrolyte precursor is washed and dried (step b).

The precursor slurry is washed with water and the pH of the solid electrolyte precursor may thus become about 7.

The washed and dried solid electrolyte precursor is mixed with the lithium source to afford a mixture (step c).

The lithium source may be LiOH.H$_2$O, LiOH, LiNO$_3$, LiCO$_3$, etc.

The lithium of the lithium source may be added in excess, taking into consideration the amount of lithium that evaporates upon calcination or sintering. The amount of lithium in the lithium source, which is included in the mixture, may be 101 to 112 parts by weight, preferably 101 to 108 parts by weight, and more preferably 102 to 107 parts by weight, based on 100 parts by weight of lithium in the final product, that is, the solid electrolyte.

Specifically, the lithium of the lithium source may be included in the above mixture so that the amount thereof is greater by 1 to 12 wt %, preferably 1 to 8 wt %, and more preferably 2 to 7 wt % than the amount of the lithium element in the solid electrolyte that is ultimately produced.

The higher the lithium content, the better the solid electrolyte. Also, the solid electrolyte may have high ionic conductivity when the structure thereof is cubic, and may have low ionic conductivity when the structure thereof is tetragonal.

In some cases, the precursor may be pulverized before being mixed with the lithium source.

The pulverization and mixing processes may be performed using a ball mill.

Finally, the mixture is calcined, thereby obtaining a calcined solid electrolyte, which is a gallium (Ga)-doped lithium lanthanum zirconium oxide (LLZO), as represented by Chemical Formula 1 (step d).

The solid electrolyte may be represented by Chemical Formula 1 below.

$$Li_xLa_yZr_zGa_wO_{12} \ (5 \leq x \leq 9, \ 2 \leq y \leq 4, \ 1 \leq z \leq 3, \ 0 < w \leq 4)$$
[Chemical Formula 1]

Also, the solid electrolyte may be represented by Chemical Formula 2 below.

$$Li_{7-3x}Ga_xLa_3Zr_2O_{12} \ (0.1 \leq x \leq 0.4)$$
[Chemical Formula 2]

The calcination may be performed at 700° C. to 1,000° C., preferably 800° C. to 950° C., and more preferably 880° C. to 920° C.

The calcination may be performed for 1 hr to 12 hr, preferably for 1 hr to 9 hr, and more preferably for 1 hr to 7 hr. However, the calcination time is not necessarily limited thereto, and may vary depending on the calcination temperature.

In some cases, preparing a sintered solid electrolyte by sintering the gallium-doped LLZO solid electrolyte may be further performed (step e).

Here, the sintering may be performed at 1,000° C. to 1,300° C., preferably 1,100° C. to 1,250° C., and more preferably 1,150° C. to 1,220° C.

The sintering may be performed for 3 hr to 7 hr, preferably for 4 hr to 6 hr, and more preferably for 4 hr 30 min to 5 hr 30 min. However, the sintering time is not necessarily limited thereto, and may vary depending on the sintering temperature.

The solid electrolyte and the sintered solid electrolyte may include at least one structure selected from among a cubic structure and a tetragonal structure, and preferably, the solid electrolyte and the sintered solid electrolyte have a single-phase cubic structure.

As described above, the solid electrolyte preferably has a cubic structure to thus realize high ionic conductivity, and the ionic conductivity thereof may decrease in the case of a tetragonal structure.

MODE FOR INVENTION

Examples

Example 1: Preparation of 0.15 Mole Ga-Doped Solid Electrolyte

As starting materials, lanthanum nitrate (La(NO$_3$)$_3$.xH$_2$O), zirconium nitrate (ZrO(NO$_3$)$_2$.xH$_2$O) and gallium nitrate (Ga(NO$_3$)$_3$.xH$_2$O) were dissolved in distilled water so that the molar ratio of La:Zr:Ga, as the metal elements thereof, was 3:2:0.15, thus preparing a 1 M starting material solution.

The starting material solution, 0.6 mole of ammonia water as a complexing agent, and an appropriate amount of sodium hydroxide aqueous solution were added to yield a mixed solution having a pH of 11, which was then subjected to coprecipitation at a reaction temperature of 25° C. for 24 hr with stirring, thus affording a precursor slurry in a liquid slurry phase.

The precursor slurry was washed with purified water and dried overnight. The dried precursor was pulverized using a ball mill and added with LiOH.H$_2$O as a lithium source such that the molar ratio (Li:Ga) of Li from the lithium source LiOH.H$_2$O and Ga of the gallium nitrate (Ga(NO$_3$)$_3$.xH$_2$O) was 6.55:0.15, followed by mixing using a ball mill, thus preparing a mixture.

Here, LiOH.H$_2$O in the mixture was added (3 wt % in excess) so that the Li content of LiOH.H$_2$O was 103 parts by weight based on 100 parts by weight of Li in the produced solid electrolyte. The mixture was calcined at 900° C. for 2 hr and then pulverized, ultimately preparing a solid electrolyte.

Example 2: Preparation of 0.25 Mole Ga-Doped Solid Electrolyte

A solid electrolyte was prepared in the same manner as in Example 1, with the exception that LiOH.H$_2$O was added such that the molar ratio (Li:Ga) of Li from the lithium source LiOH.H$_2$O and Ga of the gallium nitrate (Ga(NO$_3$)$_3$.xH$_2$O) was 6.25:0.25, rather than adding LiOH.H$_2$O such that the molar ratio (Li:Ga) of Li from the lithium source LiOH.H$_2$O and Ga of the gallium nitrate (Ga(NO$_3$)$_3$.xH$_2$O) was 6.55:0.15.

Example 3: Preparation of 0.35 Mole Ga-Doped Solid Electrolyte

A solid electrolyte was prepared in the same manner as in Example 1, with the exception that LiOH.H$_2$O was added such that the molar ratio (Li:Ga) of Li from the lithium source LiOH.H$_2$O and Ga of the gallium nitrate (Ga(NO$_3$)$_3$.xH$_2$O) was 5.95:0.35, rather than adding LiOH.H$_2$O such that the molar ratio (Li:Ga) of Li from the lithium source LiOH.H$_2$O and Ga of the gallium nitrate (Ga(NO$_3$)$_3$.xH$_2$O) was 6.55:0.15.

Comparative Example: Preparation of 0.25 Mole Al-Doped Solid Electrolyte

As starting materials, lanthanum nitrate (La(NO$_3$)$_3$.xH$_2$O), zirconium nitrate (ZrO(NO$_3$)$_2$.xH$_2$O) and aluminum nitrate (Al(NO$_3$)$_3$.xH$_2$O) were dissolved in distilled water so that the molar ratio of La:Zr:Al, as the metal elements thereof, was 3:2:0.25, thus preparing a 1 M starting material solution.

The starting material solution, 0.6 mole of ammonia water as a complexing agent, and an appropriate amount of sodium hydroxide aqueous solution were added to yield a mixed solution having a pH of 11, which was then subjected to coprecipitation at a reaction temperature of 25° C. for 4 hr with stirring, thus affording a precursor slurry in a liquid slurry phase.

The precursor slurry was washed with purified water and dried overnight. The dried precursor was pulverized using a ball mill and added with LiOH.H$_2$O as a lithium source such that the molar ratio (Li:Al) of Li from the lithium source LiOH.H$_2$O and Al of the aluminum nitrate (Al(NO$_3$)$_3$.xH$_2$O) was 6.25:0.25, followed by mixing using a ball mill, thus preparing a mixture.

Here, LiOH.H$_2$O of the mixture was added (3 wt % in excess) so that the Li content of LiOH.H$_2$O was 103 parts by weight based on 100 parts by weight of Li in the produced solid electrolyte. The mixture was calcined at 900° C. for 2 hr and then pulverized, ultimately preparing a solid electrolyte.

The component ratios of the solid electrolytes are shown in Table 1 below.

TABLE 1

| | Component ratio of solid electrolyte | | | | |
|---|---|---|---|---|---|
| | Metal precursor (metal molar ratio) | | | | Lithium source (metal molar ratio) |
| | La(NO$_3$)$_3$•xH$_2$O | ZrO(NO$_3$)$_2$•xH$_2$O | Ga(NO$_3$)$_3$•xH$_2$O | Al(NO$_3$)$_3$•xH$_2$O | LiOH•H$_2$O |
| Example 1 | 3 | 2 | 0.15 | — | 6.55 |
| Example 2 | 3 | 2 | 0.25 | — | 6.25 |
| Example 3 | 3 | 2 | 0.35 | — | 5.95 |
| Comparative Example 1 | 3 | 2 | — | 0.25 | 6.25 |

TEST EXAMPLES

Test Example 1: Measurement of Ionic Conductivity and Impedance

The solid electrolytes prepared in Examples 1 to 3 and Comparative Example 1 were measured for ionic conductivity and impedance through EIS (Electrochemical Impedance Spectroscopy) The results are shown in Table 2 below and in FIG. 2.

TABLE 2

| No. | Total ionic conductivity ($\sigma_t$) (S/cm) at RT | Impedance ($\Omega \cdot cm^2$) |
|---|---|---|
| Example 1 | 5.42 × 10$^{-4}$ | 339.51 |
| Example 2 | 7.11 × 10$^{-4}$ | 258.44 |
| Example 3 | 1.45 × 10$^{-4}$ | 1187.81 |
| Comparative Example 1 | 3.03 × 10$^{-4}$ | 439.59 |

Figure 2:
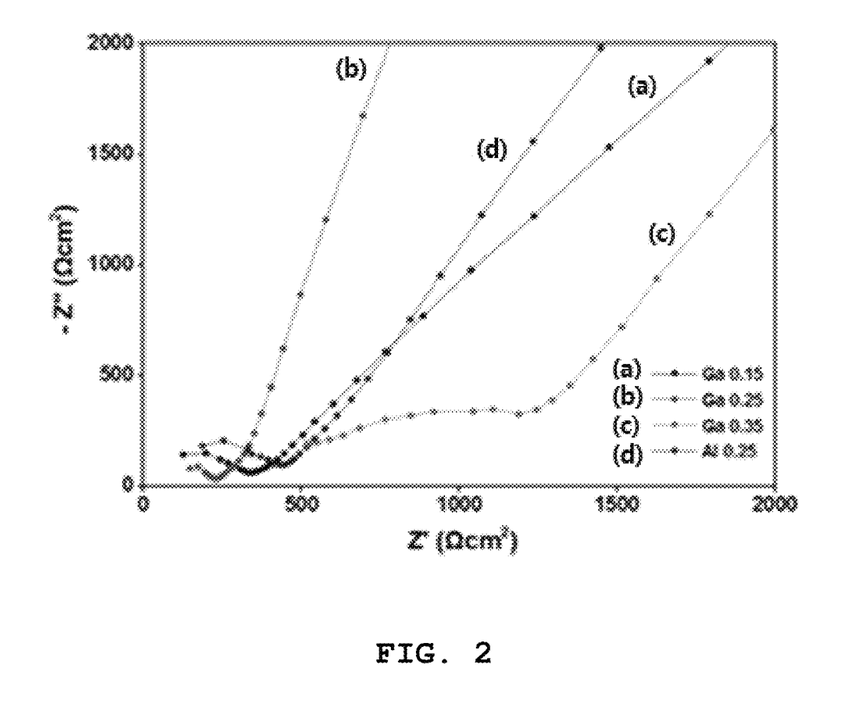
FIG. 2 shows the results of measurement of impedance of the sintered solid electrolytes of Examples 1 to 3 and Comparative Example 1.

FIG. 2 shows the resistance values of the final sintered pellets measured through EIS, and the results of calculation of ionic conductivity using the same are shown and summarized in Table 2. The LLZOs doped with 0.15 mole Ga and 0.25 mole Ga exhibited relatively good ionic conductivity. In particular, the highest ionic conductivity was obtained at 0.25 mole Ga. Accordingly, Example 2 can be confirmed to have higher ionic conductivity than the Al-doped composition of Comparative Example 1.

Test Example 2: Pellet Particle Interface Shape (SEM)

Figure 3:
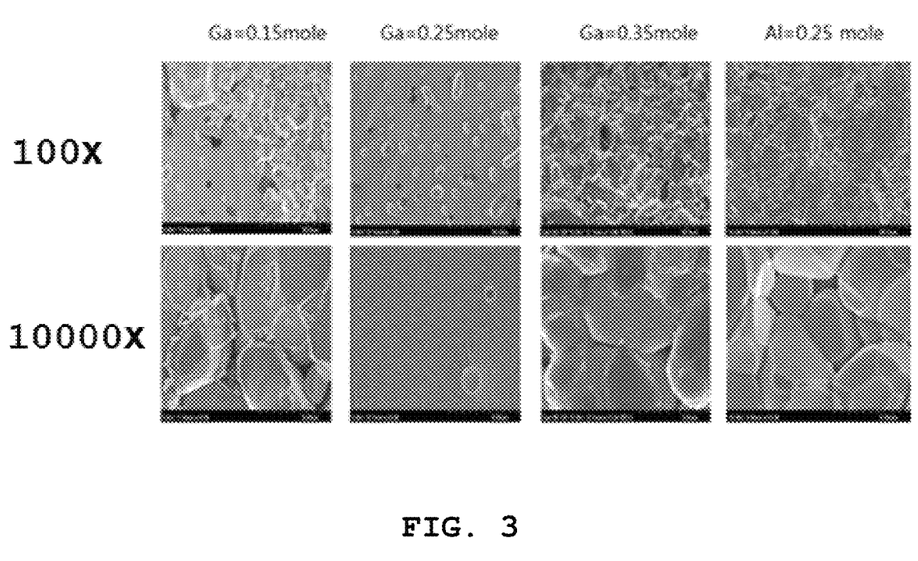
FIG. 3 shows the results of SEM observation of the solid electrolytes of Examples 1 to 3 and Comparative Example 1.

The results of SEM observation of the solid electrolytes prepared in Examples 1 to 3 and Comparative Example 1 are shown in FIG. 3. FIG. 3 illustrates the results of SEM observation depending on the amount of doped Ga (0.15 mole, 0.25 mole, 0.35 mole) and the amount of doped Al (0.25 mole) at magnifications of 100× and 10000×. Many open-pores were observed on the surfaces of the sintered pellets of Example 1, Example 3, and Comparative Example 1, respectively doped with 0.15 mole Ga, 0.35 mole Ga, and 0.25 mole Al, and sufficient sintering was not realized due to the formation of the intergranular interface. However, in the 0.25 mole Ga-doped composition of Example 2, very small close-pores were observed on the surfaces of the particles, but the intergranular interface was rarely observed. By virtue of such sintering properties, the highest ionic conductivity can be confirmed to be obtained in the 0.25 mole Ga-doped composition.

Test Example 3: Crystal Structure (XRD)

Figure 4:
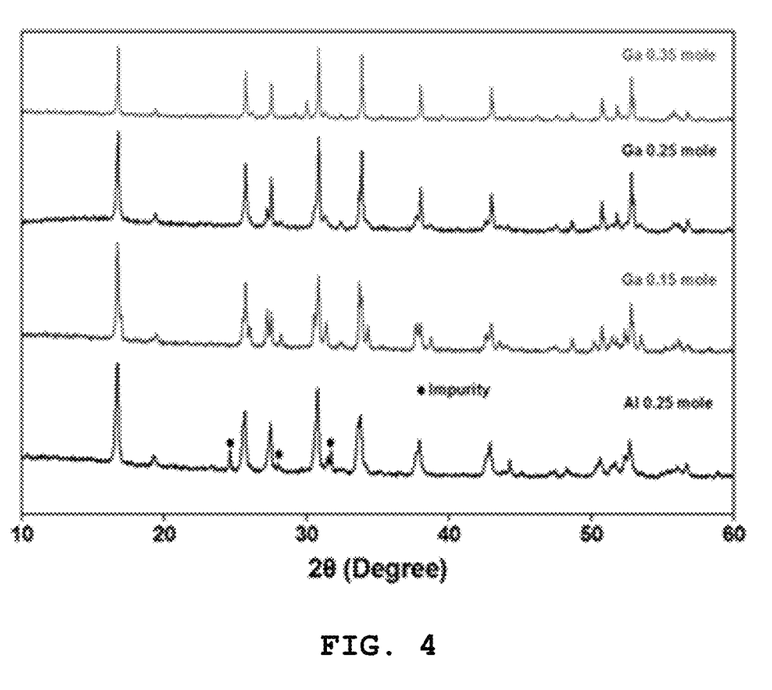
FIG. 4 shows the results of XRD analysis of the solid electrolytes of Examples 1 to 3 and Comparative Example 1.

The crystal structure and the extent of impurities depending on doping were evaluated through XRD analysis of Ga-doped LLZO solid electrolyte pellets. As shown in FIG. 4, based on the results of comparison of XRD peaks in 0.15 mole to 0.35 mole Ga and 0.25 mole Al upon calcination at 900° C., a cubic structure $LiLa_{0.5}Al_{0.5}O_2$ was partially observed in the Al-doped LLZO of Comparative Example 1. Moreover, it can be seen that a tetragonal structure was partially included in the 0.15 mole Ga-doped composition of Example 1 and also that in the 0.35 mole Ga-doped composition of Example 3, some impurities were included and the peak intensity was slightly decreased. However, the 0.25 mole Ga-doped composition of Example 2 exhibited a single-phase cubic structure in which impurities and a tetragonal structure were seldom contained.

The scope of the present invention is defined by the claims, which will be set forth below, rather than by the above detailed description, and all variations or modifications deducible from the meanings, scope and equivalents of the claims are intended to be included in the scope of the present invention.

Test Example 4: Potential Window Testing (CV: Cyclic Voltammetry

In general, LLZO solid electrolytes having a garnet structure are advantageous in that the potential window is wider than that of solid electrolyte materials having different structures (e.g. LATP, LLTO), making it easy to form a high-voltage cell. Therefore, it is necessary to reaffirm the potential window characteristics when the LLZO material having a garnet structure is doped with Ga. In order to evaluate the electrochemical potential stability of the LLZO solid electrolyte of Example 2 under optimal Ga-doping conditions (0.25 mole), a coin cell (Au/solid electrolyte/Li metal) was manufactured, and CV testing was performed at a scan rate of 1 mv/s and a potential ranging from 0 to 6.0 using a thermo-hydrostat (70° C.).

Figure 5:
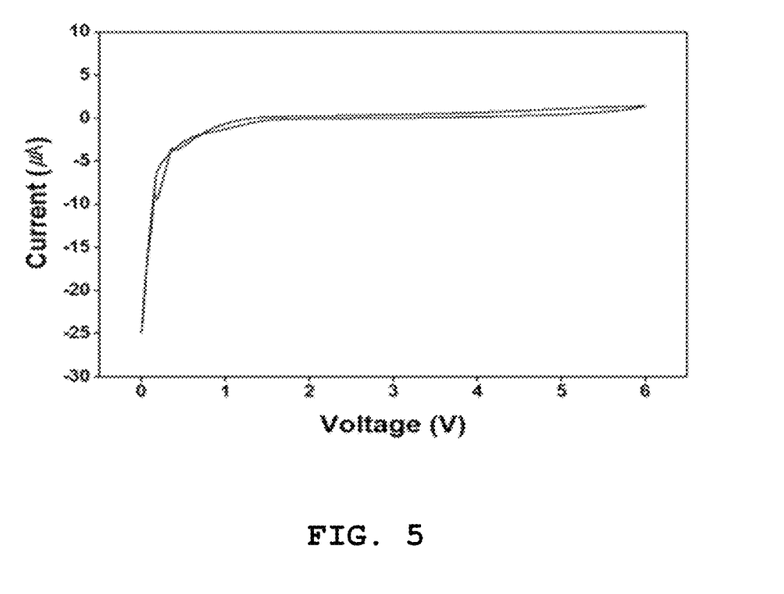
FIG. 5 shows the results of potential window testing of the solid electrolyte of Example 2.

FIG. 5 shows the evaluation results using the solid electrolyte of Example 2, in which vastly superior electrochemical stability is manifested in the potential range of 0 to 6 V, except for the lithium reduction peak of about 2 μA current at 1 V or less. This result shows that there is almost no change in the potential stability of the Ga-doped LLZO material and that the ionic conductivity of the Ga-doped LLZO material is increased 2 to 3 times compared to that of the conventional Al-doped LLZO.

INDUSTRIAL APPLICABILITY

In a method of preparing a solid electrolyte according to the present invention, the ratio of a gallium element in a starting material and a lithium element from a lithium source is adjusted to thus control a crystal structure, thereby increasing the ionic conductivity of the solid electrolyte.

Also, a solid electrolyte having increased ionic conductivity can be provided using the method of preparing the solid electrolyte as above.

What is claimed is:
1. A method of preparing a sintered solid electrolyte, the method comprising, in the order recited:
(a) coprecipitating a mixed solution comprising a lanthanum precursor, a zirconium precursor, a gallium precursor, a complexing agent, and a pH adjuster to provide a solid electrolyte precursor;
(b) washing and drying the solid electrolyte precursor to provide a washed and dried solid electrolyte precursor;
(c) mixing the washed and dried solid electrolyte precursor with a lithium source to provide a mixture;
(d) calcining the mixture to provide a calcined solid electrolyte, which is a gallium (Ga)-doped lithium lanthanum zirconium oxide (LLZO) as represented by Chemical Formula 1 below,

$$Li_xLa_yZr_zGa_wO_{12}, \quad \text{Chemical Formula 1}$$

where 5≤x≤9, 2≤y≤4, 1≤z≤3, and 0<w≤4; and
(e) sintering the calcined solid electrolyte at a temperature ranging from 1,000° C. to 1,300° C. to provide the sintered solid electrolyte,
wherein a ratio (M1:M2) of moles (M1) of a lithium element of the lithium source in step (c) to moles (M2) of a gallium element of the gallium precursor in step (a) ranges from 6.7:0.1 to 5.8:0.4.

2. The method of claim 1, wherein the solid electrolyte is represented by Chemical Formula 2 below, $$Li_{7-3x}Ga_xLa_3Zr_2O_{12}, \quad \text{Chemical Formula 2}$$

where 0.1≤x≤0.4.

3. The method of claim 1, wherein the ratio (M1:M2) of moles (M1) of the lithium element of the lithium source in step (c) to moles (M2) of the gallium element of the gallium precursor in step (a) ranges from 6.55:0.15 to 5.95:0.35.

4. The method of claim 3, wherein the ratio (M1:M2) of moles (M1) of the lithium element of the lithium source in step (c) to moles (M2) of the gallium element of the gallium precursor in step (a) ranges from 6.4:0.2 to 6.1:0.3.

5. The method of claim 4, wherein the ratio (M1:M2) of moles (M1) of the lithium element of the lithium source in step (c) to moles (M2) of the gallium element of the gallium precursor in step (a) ranges from 6.25:0.25.

6. The method of claim 2, wherein the lanthanum precursor is lanthanum nitrate hydrate ($La(NO_3)_3 \cdot xH_2O$).

7. The method of claim 2, wherein the zirconium precursor is zirconium nitrate hydrate ($ZrO(NO_3)_2 \cdot xH_2O$).

8. The method of claim 2, wherein the gallium precursor is gallium nitrate hydrate ($Ga(NO_3)_3 \cdot xH_2O$).

9. The method of claim 2, wherein the complexing agent is ammonium hydroxide ($NH_4OH$).

10. The method of claim 2, wherein the pH adjuster is sodium hydroxide (NaOH).

11. The method of claim 2, wherein the lithium source is lithium hydroxide hydrate ($LiOH \cdot H_2O$).

12. The method of claim 2, wherein calcining is performed at 700° C. to 1,000° C.

13. The method of claim 1, wherein mixing the washed and dried solid electrolyte precursor with a lithium source to provide a mixture in step (c) is accomplished by:
(i) pulverizing the washed and dried solid electrolyte precursor in a ball mill to provide a pulverized solid electrolyte precursor;

(ii) adding the lithium source into the ball mill; and
(iii) ball milling to mix the pulverized solid electrolyte precursor and the lithium source and provide the mixture.

* * * * *